651887
EXAMINER
51
July 10, 1951 W. S. HALSTEAD 2,559,613
TELEVISION DISTRIBUTION SYSTEM
Filed March 4, 1946
Uses hallways of house as waveguide. Each apartment has pick-up antenna inserted into hall.
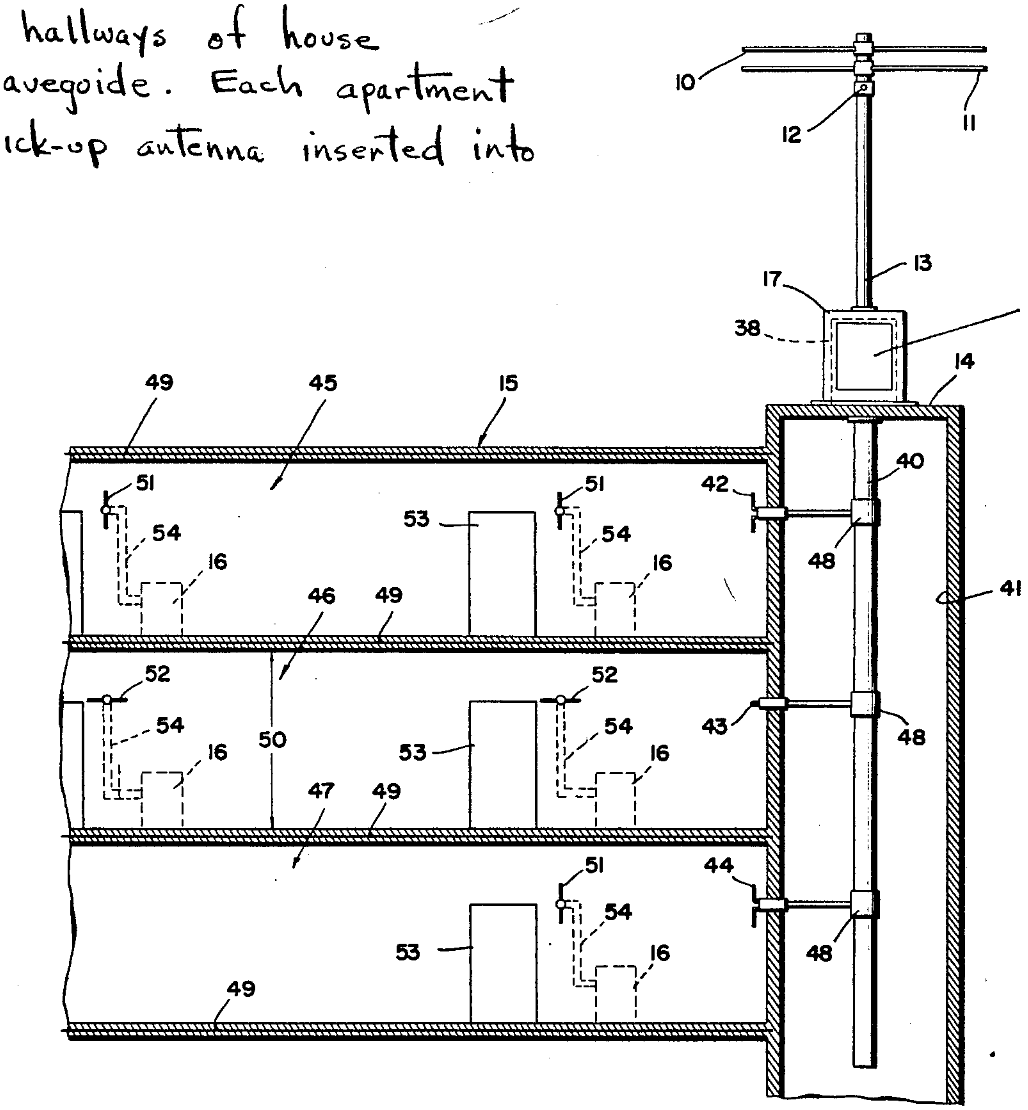
INVENTOR
WILLIAM S. HALSTEAD
BY [signature]
ATTORNEY

EXAMINER

Patented July 10, 1951 2,559,613

UNITED STATES PATENT OFFICE 2,559,613

TELEVISION DISTRIBUTION SYSTEM

William S. Halstead, Purchase, N. Y., assignor, by mesne assignments, to Farnsworth Research Corporation, a corporation of Indiana Application March 4, 1946, Serial No. 651,887

6 Claims. (Cl. 250—15)

This invention relates to a system for distributing ultra-high frequency signals, and particularly relates to a distribution system arranged for interconnecting a number of master antennae with a multiplicity of receivers located in one building without utilizing individual networks including matched transmission lines.

It is practically impossible to provide a separate receiving antenna on the roof of a large building, such, for example, as an apartment house. for each television receiver located in the building. It has been suggested, therefore, to provide one master antenna for each television channel to be received and an impedance matching transmission line network for interconnecting the master antennae with each receiver. It will be obvious that an impedance matching network will be required for each channel to be received. A distribution system of this type is reliable in operation and may be designed to supply a large number of receivers with the ultra-high frequency modulated carrier waves intercepted by the master antennae.

Such a distribution system has, however, certain drawbacks. The impedance matching networks which usually consist of transmission lines are expensive to install. Whenever a new transmission channel is provided, a further impedance matching network must be added for the new channel. Since all receivers are interconnected through the same networks, a defective receiver or a receiver with an improperly matched input circuit will react on the entire distribution system. It is, therefore, desirable to provide a system for distributing modulated carrier waves of ultra-high frequency between the master antennae and the receivers of a building without utilizing complicated impedance matching networks including matched transmission lines.

It is an object of the present invention, therefore, to provide a distribution system for receiving a plurality of modulated carrier waves by individual master antennae and retransmitting the waves simultaneously along predetermined paths by means of retransmitting antennae.

Another object of the invention is to provide a multi-channel distribution system for selectively receiving signals in each channel with any one of a plurality of receivers and wherein an additional transmission channel may be provided without requiring expensive additional transmission line networks.

A further object of the invention is to provide a distribution system for transmitting simultaneously a plurality of modulated carrier waves on each floor of a building without utilizing a matched transmission line network for each wave to be transmitted.

In accordance with the present invention, there is provided, in a system for distributing modulated carrier waves, a master receiving antenna for each of the carrier waves, a plurality of retransmitting antennae, and means for interconnecting the master antennae with each of the retransmitting antennae. Thus the carrier waves are simultaneously retransmitted from each of the retransmitting antennae.

For a better understanding of the invention, together with other and further objects thereof, reference is made to the following description, taken in connection with the accompanying drawing, and its scope will be pointed out in the appended claims.

In the accompanying drawing, the single figure is a sectional view of a building provided with the distribution system of the invention.

Referring to the drawing, there is illustrated a distribution system in accordance with the invention comprising master antennae 10, 11 and 12 adjustably secured to antenna mast 13. Master antennae 10, 11 and 12 may each consist of a half-wave dipole as illustrated or of a conventional high-gain directive antenna array. Each master antenna 10, 11 and 12 is tuned to a different wave length corresponding to that of the modulated carrier wave to be received. Furthermore, each master antenna 10, 11 and 12 is oriented with respect to its associated transmitting antenna for providing maximum signal strength. The number of master antennae arranged on antenna mast 13 should be equal to the number of different modulated carrier waves which it is desired to receive.

Antenna mast 13 is preferably mounted on roof 14 of building 15 which may, for example, be a large apartment house provided with a multiplicity of apartments each having a television receiver indicated at 16. Housing 17 by which antenna mast 13 is supported may enclose a broad-band amplifier 38 which may, for example, consist of an electron multiplier or any other conventional amplifier.

Each master antenna 10, 11 and 12 is preferably connected with a transmission line which is connected in turn to broad-band amplifier 38 where the modulated carrier waves intercepted by master antennae 10, 11 and 12 may be simultaneously amplified. The output signal of broad-band amplifier 38 may be obtained from transmission line 40 which preferably consists of a coaxial cable to reduce attenuation losses of the signal. The output signal obtained from transmission line 40 accordingly consists of the amplified modulated carrier waves intercepted by master antennae 10, 11 and 12.

Transmission line 40 extends vertically through shaft 41 of building 15 which may be the elevator shaft or a suitable ventilating shaft. In accordance with the present invention, there is provided a retransmitting antenna such as 42, 43 and 44 on each floor or hallway such as 45, 46 and 47 of building 15. Each retransmitting antenna 42, 43 and 44 is connected to transmission line 40 by means of a coupling unit 48 for the purpose of providing optimum impedance matching between the individual retransmitting antennae 42, 43 and 44 and transmission line 40.

Preferably retransmitting antennae 42 to 44, are arranged as broad-band dipoles, that is, dipoles which have an appreciable thickness. Broad-band dipoles 42 to 44 may all be arranged either horizontally or vertically. It is preferred, however, to arrange, for example, dipoles 42 and 44 vertically, and the intermediate dipole 43 horizontally so that alternate dipoles are arranged at right angles with respect to each other. When dipoles 42 to 44 are arranged in this manner, the possibility is reduced that the wave patterns developed by retransmitting antenna 42 in hallway 45 will disturb the wave patterns developed by the waves retransmitted by antenna 43 in the adjacent hallway 46, and so forth.

Preferably hallways 45 to 47 act as wave guides for the modulated carrier waves radiated by retransmitting antennae 42 to 44. It is well known that a wave guide of substantially rectangular cross section may be excited by a dipole antenna at any frequency above the critical frequency. The critical frequency is substantially determined by the dimension of the wave guide in a plane at right angles to the direction of propagation of the waves and perpendicular to the exciting dipole. If this dimension is at least half a wave length of the wave having the lowest frequency to be transmitted along hallways 45 to 47, the wave guides or hallways may be excited at that lowest frequency and at any higher frequency. If it is assumed that the modulated carrier wave with the largest wave length retransmitted by antennae 42 to 44 has a frequency of 50 megacycles, this dimension should be no less than three meters corresponding to approximately ten feet. Accordingly, height 50 of hallway 46 should be no less than three meters while the width of hallways 45 and 47 also should be no less than three meters for transmitting a wave of a frequency of 50 megacycles.

The hallways such as 45, 46 and 47 of any large building will usually include electrical wiring indicated at 49 as well as structural metal when the floors are made of reinforced concrete. The electric waves transmitted by antennae 42 to 44 will, therefore, travel along the conductors in the floors or walls of hallways 45 to 47 thereby to provide a higher signal strength.

Each receiver 16 located on hallways 45 and 47 is associated with a receiving antenna 51 and each reeciver 16 arranged in hallway 46 is provided with a receiving antenna 52 which may consist of a half wave dipole. Preferably receiving antennae 51 which are adapted to receive the modulated carrier waves transmitted by retransmitting antennae 42 and 44 are arranged vertically, that is, parallel to retransmitting dipoles 42 and 44. On the other hand, receiving antennae 52 are preferably arranged horizontally, that is, parallel to retransmitting antenna 43. Receiving dipoles 51 and 52 may be arranged in the hallways, that is, outside of each apartment door 53. Receiving antennae 51 and 52 are individually connected to their respective receivers 16 by a transmission line 54.

It is well known that the wave pattern developed, for example, in hallway 45 by retransmitting antenna 42 is disturbed by any moving object such as a person walking along the hallway. In order to minimize this effect, it is preferred to provide each receiver 16 with an automatic volume control circuit well known to those skilled in the art. In this manner any decrease of the signal strength caused by persons walking through the hallways may be substantially compensated.

The distribution system of the invention provides complete isolation of each receiver 16 with respect to the entire system. Thus a defective receiver or a receiver with an improperly matched input circuit cannot react on any other receiver or on the retransmitting antennae 42 to 44. Furthermore, the distribution system illustrated in the drawing only requires one transmission line 40 for interconnecting broad-band amplifier 38 with retransmitting antennae 42 to 44, in addition to a few transmission lines for individually coupling master antennae 10 to 12 to broad-band amplifier 38. Thus when it is desired to add a new transmission channel, all that is necessary is to provide another master antenna on mast 13 and to connect it to broad-band amplifier 38.

When high gain master antenna arrays are utilized or when the signal strength is sufficiently high, broad-band amplifier 38 may be omitted. In that case, the individual transmission lines which are connected to the master antennae may be connected directly to transmission line 40 which, in turn, is connected to retransmitting antennae 42 to 44.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a building having a plurality of floors, a system for distributing modulated carrier waves comprising master receiving antennae for individually intercepting each of said carrier waves, a transmitting antenna for each of said floors, means including a transmission line for interconnecting said master antennae with each of said transmitting antennae, thereby to radiate the carrier waves intercepted by said master antennae simultaneously along each of said floors, groups of receivers, each group being located on one of said floors, a receiving antenna for each of said receivers and wave guides comprising the hall structure of said building extending between each transmitting antenna and each group of receivers.

2. In a building having a plurality of floors, a system for distributing modulated carrier waves comprising master receiving antennae for individually intercepting each of said carrier waves, said master antennae being located above said building, a broad band transmitting antenna for each of said floors, conductor means including a

EXAMINER transmission line for interconnecting said master antennae with each of said transmitting antennae, thereby to radiate the carrier waves intercepted by said master antennae simultaneously along each of said floors, groups of receivers, each group being located on one of said floors, a receiving antenna for each of said receivers and wave guides comprising the hall structure of said building extending between each transmitting antenna and each group of receivers.

3. In a building having a plurality of floors, a system for distributing modulated carrier waves comprising master receiving antennae for individually intercepting each of said carrier waves, a broad band amplifier for simultaneously amplifying said carrier waves, means for connecting said master antennae with said broad band amplifier, said master antennae being located above said building, a broad band transmitting antenna for each of said floors, a transmission line for interconnecting said broad band amplifier with each of said transmitting antennae, thereby to radiate the amplified carrier waves intercepted by said master antennae simultaneously along each of said floors, groups of receivers, each group being located on one of said floors, a receiving antenna for each of said receivers and wave guides comprising the hall structure of said building extending between each transmitting antenna and each group of receivers.

4. In a building having a plurality of floors and a hallway on each of said floors, a system for distributing modulated carrier waves comprising master receiving antennae for individually intercepting each of said carrier waves, a transmitting dipole for each of said hallways, each of said hallways having a dimension perpendicular to the direction of propagation of said waves and at right angles to its associated transmitting dipole which is not less than half a wave length of the carrier wave to be distributed having the lowest frequency, thereby to arrange each of said hallways as a wave guide for said carrier waves, conductor means including a transmission line for interconnecting said master antennae with each of said transmitting dipoles to radiate the carrier waves intercepted by said master antennae simultaneously along each of said hallways, groups of receivers, each group being located on one of said floors, and a receiving antenna for each of said receivers.

5. In a building having a plurality of floors and a hallway on each of said floors, a system for distributing modulated carrier waves comprising master receiving antennae for individually intercepting each of said carrier waves, a broad band transmitting dipole for each of said hallways, the transmitting dipoles provided in adjacent hallways being arranged at right angles to each other, conductors including a transmission line for interconnecting said master antennae with each of said transmitting dipoles, thereby to radiate the carrier waves intercepted by said master antennae simultaneously along each of said hallways, groups of receivers, each group being located on one of said floors, and a receiving antenna for each of said receivers.

6. In a building having a plurality of floors and a hallway on each of said floors, a system for distributing modulated carrier waves comprising master receiving antennae for individually intercepting each of said carrier waves, a broad band amplifier for simultaneously amplifying said carrier waves, means for connecting said master antennae with said broad band amplifier, said master antennae being located above said building, a broad band transmitting dipole for each of said hallways, each of said hallways having a dimension perpendicular to the direction of propagation of said waves and at right angles to its associated transmitting dipole which is not less than half a wave length of the carrier wave to be distributed having the lowest frequency, thereby to arrange each of said hallways as a wave guide for said carrier waves, the transmitting dipoles provided in adjacent hallways being arranged at right angles to each other, a transmission line for interconnecting said broad band amplifier with each of said transmitting dipoles, thereby to radiate the amplified carrier waves intercepted by said master antennae simultaneously along each of said hallways, groups of receivers, each group being located on one of said floors, and a receiving antenna for each of said receivers.

WILLIAM S. HALSTEAD.

REFERENCES CITED

The following references are of record in the file of this patent:

UNITED STATES PATENTS

| Number | Name | Date |
|---|---|---|
| 1,733,609 | Kuhn | Oct. 29, 1929 |
| 1,881,395 | Aull, Jr. | Oct. 4, 1932 |
| 1,918,291 | Schroter | July 18, 1933 |
| 1,931,236 | Nicolson | Oct. 17, 1933 |
| 1,989,466 | Satterlee et al. | Jan. 29, 1935 |
| 2,008,280 | Hopkins | July 16, 1935 |
| 2,028,857 | Zworykin | Jan. 28, 1936 |
| 2,064,961 | Tidd | Dec. 22, 1936 |
| 2,155,821 | Goldsmith | Apr. 25, 1939 |
| 2,298,435 | Tunick | Oct. 13, 1942 |
| 2,337,184 | Carter | Dec. 21, 1943 |
| 2,394,917 | Kallmann | Feb. 12, 1946 |
| 2,407,417 | Halstead | Sept. 10, 1946 |

FOREIGN PATENTS

| Number | Country | Date |
|---|---|---|
| 373,919 | Great Britain | June 2, 1932 |
| 878,002 | France | Sept. 21, 1942 |